No. 679,091. Patented July 23, 1901.
F. P. SCHAAF.
TIRE BOLTING MACHINE.
(Application filed June 25, 1900.)
(No Model.)
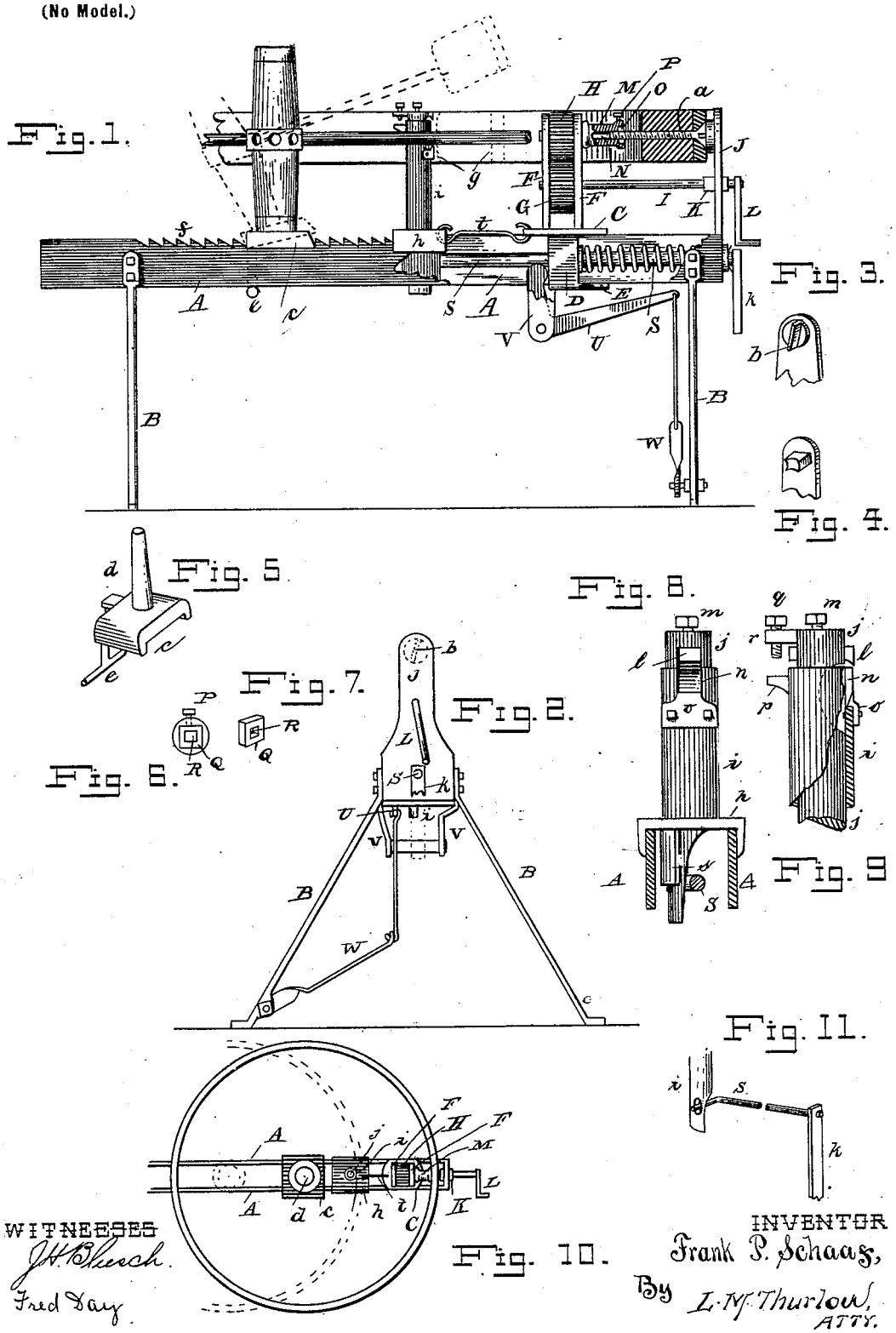

UNITED STATES PATENT OFFICE.

FRANK P. SCHAAF, OF CHANDLERVILLE, ILLINOIS.

TIRE-BOLTING MACHINE.

SPECIFICATION forming part of Letters Patent No. 679,091, dated July 23, 1901.

Application filed June 25, 1900. Serial No. 21,582. (No model.)

*To all whom it may concern:*

Be it known that I, FRANK P. SCHAAF, a citizen of the United States, residing at Chandlerville, in the county of Cass and State of Illinois, have invented certain new and useful Improvements in Tire-Bolting Machines; and I do hereby declare that the following is a full, clear, and exact description of the invention, which will enable others skilled in the art to which it appertains to make and use the same.

This invention pertains to a tire-bolting machine.

One object of the invention is to furnish a machine of simple construction for quickly "running on" and setting the nuts of bolts used in securing wagon or other vehicle tires to their rims.

A further object is to provide simple and efficient means for cutting off the protruding ends of the bolts after the nuts have been set. It is well known that the work necessary in accomplishing these operations by hand is both tedious and laborious, to say nothing of the length of time consumed in so doing. In actual use it is found that my improved device will enable a single person to complete a tire within the space of one minute, when by hand the same work would consume the greater part of an hour.

In the appended drawings, Figure 1 is a side elevation of my device. Fig. 2 is an end elevation. Fig. 3 is a perspective view of a form of bolt-head holder. Fig. 4 is also a perspective view of a modified form of this portion of the implement. Fig. 5 is a perspective view of a carrier for the hub of the wheel being bolted. Fig. 6 is a face view of a chuck. Fig. 7 is a perspective view of a portion used with said chuck. Fig. 8 is a front elevation of a cutter for clipping the ends of the bolts after being set in place. Fig. 9 is a side elevation of the same. Fig. 10 is a plan view of enough of the machine to illustrate the position of the wheel-hub and felly and tire with relation to the operating portions. Fig. 11 is a perspective view of means for operating a cutter.

The bed of the machine is composed of the sides A A, mounted on legs B B and held in fixed relation to each other by any desired means. Carried on the top of the machine near one end is a carriage composed of the bed C, having a depending lug D, carrying a plate E. Upon the bed are mounted two vertical supports F F, between which are carried two gears G and H. A horizontal shaft I is keyed to the lower gear and extends through an upright or standard J, in which is held a suitable bearing. Said shaft terminates in a crank L beyond said standard J, the use of which will be shown presently. The upper gear H has a shaft to which is secured a chuck M, having a bore N for receiving the nuts of the bolts being operated on. A square recess O in the free end of the chuck, Fig. 1, receives and holds, by means of a screw P, a block Q, Figs. 6 and 7, having an opening R for receiving the said nuts. I provide this arrangement so that blocks having various-sized openings may be used to accommodate nuts of different sizes, as will be understood. The gears G and H being in mesh, a turn of the crank L to the right will move the chuck M in a reverse direction to run a nut upon a bolt placed to receive it, as shown in Fig. 1. I have mentioned the bed C, lug D, and plate E as a means for carrying the gears; but other means may be used, though with a snugly-fitting arrangement of the form described the carriage will move smoothly and without pinching or binding.

Through lug D passes a pin S, projecting through the end of the machine-frame, as shown. A spring T surrounds the pin and bears against the lug at one end and the end of the frame at the other. A lever U is hung from the machine-frame A between ears or lugs V. The shorter end of the lever bears against the lug D, while the other carries a foot-lever W, substantially in the manner shown. By depressing the lever the carriage will be shifted in one direction, while the spring will move said carriage in an opposite direction when the pressure from the lever is removed. I have shown in Fig. 1 a vehicle-wheel in section, showing its rim or felly thrust against the end portion J. The bolt *a* therein is shown with a screw-head engaged by a bit *b*, Fig. 3, on the said end portion J. This holds the bolt from turning when the nut is being placed thereon. If a square-headed bolt is being used a device of the form shown in Fig. 4 may be substituted for the said portion *b*. The hub of the wheel is supported on a carrier composed of a plate *c*, adapted to rest on and engage a series of notches *f* on the portions A, as shown. A pin *d* on said plate receives the hub, and a depending inverted-T-shaped lug on the plate engages the under edges of the said portions A and prevents the plate tipping except in one direction. After the wheel has been placed on said pin *d* the rim thereof may be carried to its position for bolting, as shown in Fig. 1, or it may be raised, as shown in dotted lines, and pushed rearwardly and then lowered to the position shown in broken lines at *g*, where the protruding ends of the bolts may be cut off by the means now to be described. Mounted to slide on the sides A is a plate *h*, having a vertical tube *i* secured thereto, and within which slides a snugly-fitting plug *j*. The latter carries near its upper end a knife *l* held by a set-screw *m*. A slot *n* in the tube permits the knife to move up and down to meet a knife *o*, secured at the bottom of the slot upon the said tube *i*. A lug *p* on the tube and a lug *r* on the portion *j* limit the downward movement of the upper knife by means of a screw *q*, whereby the two knives will just meet. When the latter have become worn, the screw may be adjusted to allow them to approach nearer to each other to more perfectly accomplish their work. A recess in the portion *j* permits the end of the bolt being cut to enter, so that the knives may sever it at any desired point from its ends. The pin S, before described, extends through the lug D and is bent at right angles and terminates in a slot in the portion *i*, as shown in Fig. 11. A suitable guide *s* on the under side of the plate *h* prevents any sidewise binding of the parts when under pressure. However, any other means for accomplishing this may be employed. A link *t* connects the plate *c* of the gear-carrier and the plate *h*, so that a movement of the lever W will shift both portions.

The operation of the machine is exceedingly simple and may be understood by the following: The wheel being tired and bolted is placed over the pin *d* of the plate *c*, as described, in such manner as to carry the rim against the end upright J, with the head of the bolt *a* engaging the bit *b*. The nut to be placed on the bolt is set in the chuck, and the operator's foot depresses the lever W, and at the same time the crank L is turned to the right. This carries the nut to and upon the bolt and screws it up against the rim as firmly as desired. Then by releasing the said lever the spring carries the chuck away from the rim, and the next bolt is proceeded with in like manner, it being only necessary to swing the wheel on the pin *d* to bring each bolt in line with the chuck. After all the nuts have been set the rim is raised and pushed back to the position in front of the cutter, as indicated in broken lines at *g*, when each bolt-end may be cut off. When in that position, with the plate *c* in engagement with the notches *f* of the sides A, the foot-lever is depressed, thus carrying the cutting apparatus against the wheel-rim. Then by a pressure of the hand upon the lever *k*, which is secured on the outer end of the said pin S, the bolt is cut off, each being treated in like manner. In this way a large amount of work can be done in a given time.

Other means of shifting the cutting device and operating it may of course be used. I merely show and describe one way of so doing.

Having thus described my invention, I claim—

1. In a tire-bolting machine the bed A having the legs B, a series of teeth on the top thereof, a slidable plate on the bed adapted to engage the said teeth, a pin *d* on the plate for receiving and holding a vehicle-wheel, in combination with a gear-carrier slidably mounted on the frame consisting of the vertical supports F F, gears journaled between them for operating in opposite directions as set forth, means for driving them, a foot-lever for shifting the gears upon the frame, the same being pivotally hung from the bed A and a chuck adapted to revolve with one of the gears for the purpose described.

2. In a tire-bolting machine the bed A having the legs B, a series of teeth on the top thereof, a slidable plate on the bed adapted to engage the said teeth, a pin *d* on the plate for receiving and holding a vehicle-wheel, in combination with a gear-carrier slidably mounted on the frame consisting of the vertical supports F F, gears journaled between them for operating in opposite directions, as set forth, means for driving them, a foot-lever for shifting the gears upon the frame, the same being pivotally hung from the bed A, a chuck adapted to revolve with one of the gears for the purposes described, and means for holding the head of a bolt being operated upon and which is held in the vehicle-wheel held on said pin *d* as set forth.

3. In a tire-bolting machine the bed A having the supporting-legs B, a series of teeth on the top of the bed, a slidable plate *c* on the bed adapted to engage with the teeth for the purposes set forth, a pin *d* on the plate for receiving and holding a vehicle-wheel, means for preventing the said plate tipping, a gear-carrier slidable on the bed A consisting of the upright supports F F, gear-wheels journaled between them, a chuck held and driven by one of such gears, means for driving said gears, a lever for shifting such gears on the bed, a spring for carrying the gears to their normal position on the bed after movement by the lever, and means for holding the head of a bolt being operated on and which is in the vehicle-wheel on the plate *c* all being arranged substantially as described and shown.

In testimony whereof I affix my signature in presence of two witnesses.

FRANK P. SCHAAF.

Witnesses:
JOHN C. MORSE,
WILLIAM T. PRATT.